United States Patent
Remboski et al.

(10) Patent No.: US 11,177,749 B2
(45) Date of Patent: Nov. 16, 2021

(54) SYSTEM AND METHOD FOR ROTOR POSITIONING WITHIN AN ELECTRIC MOTOR

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE)

(73) Assignee: Neapco Intellectual Property Holdings, LLC, Farmington Hills, MI (US)

( * ) Notice: Subject to any disclaimer, the term of this patent is extended or adjusted under 35 U.S.C. 154(b) by 0 days.

(21) Appl. No.: 16/522,838

(22) Filed: Jul. 26, 2019

(65) Prior Publication Data
US 2020/0036312 A1   Jan. 30, 2020

Related U.S. Application Data

(60) Provisional application No. 62/711,107, filed on Jul. 27, 2018.

(51) Int. Cl.
*H02P 7/29* (2016.01)
*H02P 21/12* (2016.01)
(Continued)

(52) U.S. Cl.
CPC .............. *H02P 21/12* (2013.01); *H02P 21/05* (2013.01); *H02P 21/22* (2016.02); *H02P 2207/01* (2013.01); *H02P 2207/05* (2013.01)

(58) Field of Classification Search
CPC ...... H02P 21/22; H02P 21/05; H02P 2207/05; H02P 21/12; H02P 2207/01; H02P 21/50;
(Continued)

(56) References Cited

U.S. PATENT DOCUMENTS

| 3,855,490 A | * | 12/1974 | Sidell | H02K 21/185 310/162 |
| 4,670,696 A | * | 6/1987 | Byrne | H02K 19/103 310/168 |

(Continued)

FOREIGN PATENT DOCUMENTS

| EP | 3118976 A1 | 1/2017 |
| WO | 2018211101 A1 | 11/2018 |

OTHER PUBLICATIONS

Reichert T et al; "Bearingless 300-W PMSM for Bioreactor Mixing," IEEE Transactions on Industrial Electronics, IEEE Service Center, Piscataway, NJ, USA, vol. 59, No. 3, Mar. 1, 2012, pp. 1376-1388.

(Continued)

*Primary Examiner* — Muhammad S Islam
(74) *Attorney, Agent, or Firm* — Dickinson Wright PLLC

(57) ABSTRACT

A system for controlling an electric motor including a rotor supported by a lubricant upon a stator with a plurality of stator poles and stator windings includes monitoring a radial position and rotor angle of the rotor by a controller. The system includes generating adjustments by the controller to cause the stator poles to apply a net radial force to the rotor. This net radial force may be used, for example, to cause the rotor to be centered upon a central axis of the electric motor and may be particularly advantageous for a lubricant supported rotor. A motor drive provides an AC current to the stator windings as well as phase current adjustments of the electrical current in one or more of the stator windings to apply the net radial force to the rotor in a direction perpendicular to the drive axis.

15 Claims, 4 Drawing Sheets

(51) Int. Cl.
*H02P 21/22* (2016.01)
*H02P 21/05* (2006.01)

(58) Field of Classification Search
CPC ........ H02P 6/16; H02P 25/02; F16C 32/0497; H02K 7/086; H02K 7/09
See application file for complete search history.

(56) References Cited

U.S. PATENT DOCUMENTS

| | | | | |
|---|---|---|---|---|
| 5,291,115 | A * | 3/1994 | Ehsani | H02P 25/089 318/400.4 |
| 5,880,550 | A | 3/1999 | Fukao et al. | |
| 6,020,665 | A * | 2/2000 | Maurio | F16C 32/0444 310/90.5 |
| 6,163,127 | A * | 12/2000 | Patel | B60L 15/20 318/700 |
| 6,315,452 | B1 * | 11/2001 | Titcomb | G11B 5/4813 310/51 |
| 9,112,386 | B2 * | 8/2015 | Roopnarine | H02K 9/02 |
| 2006/0284581 | A1 * | 12/2006 | Mullin | H02P 3/18 318/362 |
| 2009/0134734 | A1 * | 5/2009 | Nashiki | H02K 19/103 310/162 |
| 2010/0284824 | A1 * | 11/2010 | Hippen | F02B 39/10 417/44.1 |
| 2012/0056575 | A1 * | 3/2012 | Dial | H02K 1/246 318/701 |
| 2013/0180057 | A1 * | 7/2013 | Babbitt | D06L 1/00 8/142 |
| 2014/0210285 | A1 * | 7/2014 | Fahimi | H02K 19/06 310/46 |
| 2016/0126790 | A1 * | 5/2016 | Piech | H02K 1/276 310/156.12 |
| 2016/0134212 | A1 * | 5/2016 | Kikuchi | H02P 6/085 318/400.21 |
| 2017/0288515 | A1 * | 10/2017 | Jeung | H02K 16/00 |
| 2018/0262091 | A1 * | 9/2018 | Gieras | H02K 11/046 |

OTHER PUBLICATIONS

Sun Xiaodong et al; "High Performance Control for a Bearingless Permanent-Magnet Synchronous Motor Using Neural Network Inverse Scheme Plus Internal Model Controllers," IEEE Transactions on Industrial Electronics, IEEE Service Center, Piscataway, NJ, USA, vol. 63, No. 6, Jun. 1, 2016, pp. 3479-3488.

Naoto Yamamoto et al; "Experimental Estimation of a 5-Axis Active Control Type Bearingless Canned Motor Pump," Electric Machines & Drives Conference, 2011 IEEE International, IEEE, May 15, 2011, pp. 148-153.

* cited by examiner

SYSTEM AND METHOD FOR ROTOR POSITIONING WITHIN AN ELECTRIC MOTOR

CROSS REFERENCE TO RELATED APPLICATION

This U.S. utility patent application claims the benefit of U.S. Provisional Patent Application Ser. No. 62/711,107, filed on Jul. 27, 2018, the contents of which is incorporated herein by reference in its entirety.

FIELD OF THE INVENTION

The present disclosure relates generally to a system and method for controlling an electric motor. More specifically, the present disclosure relates to a system and method for controlling electrical currents in stator windings of an electric motor to control a position of a rotor within the electric motor.

BACKGROUND OF THE INVENTION

Electric motors commonly include a rotor that is rotated about a drive axis by electromagnetic interaction with stator poles supporting stator windings, which are energized with an electrical current.

Traditional electric motors include the rotor being supported upon a rotor spindle which is mounted on spindle bearings that hold the rotor in a radial position centered relative to the stator poles. Spindle bearings must be strong enough to withstand radial and torsional loads applied to the rotor. Such spindle bearings are subject to wear and tear and can result in failure of the electric motor if they become worn out or otherwise damaged. Spindle bearings also contribute to the weight of traditional electric motors.

SUMMARY

A system for controlling an electric motor is provided. The electric motor includes a rotor rotatable about a drive axis and a stator including a plurality of stator poles radially spaced apart from one another about a central axis. The system includes a controller configured to monitor a radial position of the rotor relative to the stator poles, and a motor drive configured to provide an AC electrical current to each of a plurality stator windings for controlling the rotor to rotate about the drive axis. The controller is configured to cause the motor drive to provide an electrical current in one or more of the stator windings to control the radial position of the rotor.

A method for controlling a radial position of a rotor of an electric motor is also provided. The method includes controlling application of electrical current to plurality of stator windings in a stator of the electric motor to control rotation of the rotor about a drive axis; measuring a radial position of the rotor relative to a central axis of the stator; and providing an electrical current in one or more of the plurality of stator windings to apply a net radial force to the rotor and to cause the rotor to move radially and transverse to the central axis.

BRIEF DESCRIPTION OF THE DRAWINGS

Further details, features and advantages of designs of the invention result from the following description of embodiment examples in reference to the associated drawings.

DETAILED DESCRIPTION OF THE ENABLING EMBODIMENTS

Figure 1A:
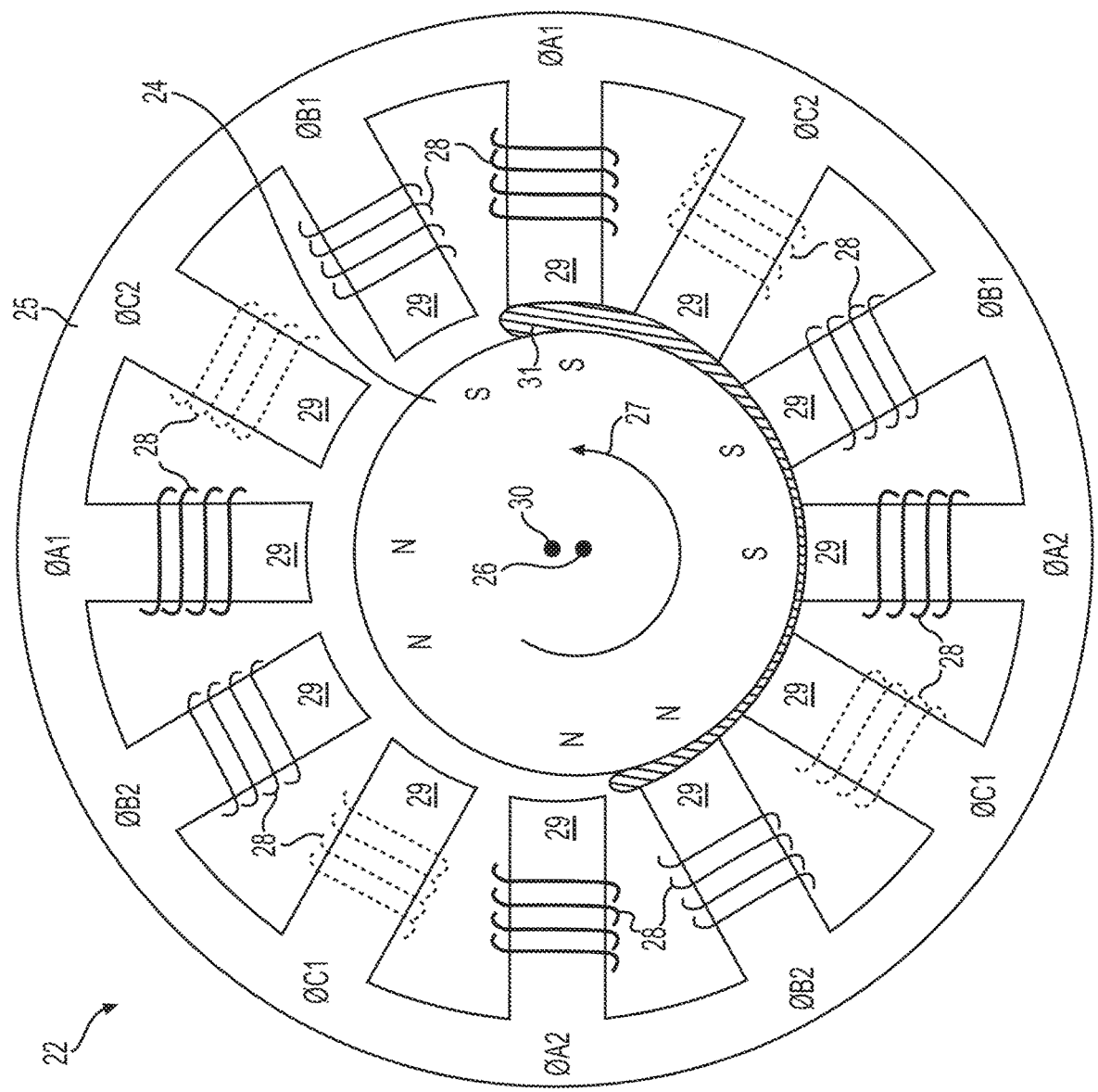
FIG. 1A is a cut-away side view of an example electric motor in a first position.

Recurring features are marked with identical reference numerals in the figures, in which an example embodiment of a system 20 for controlling an electric motor 22 is disclosed. In some embodiments, the electric motor 22 is used as a traction motor for propelling a wheeled vehicle, such as a car or truck. More specifically, in some embodiments, the electric motor 22 is disposed within or adjacent to a wheel of a wheeled vehicle. Such wheel-end motor applications can subject the electric motor 22 to large forces (e.g. forces resulting from bumps and other irregular terrain). Such wheel-end motor applications can benefit from reductions in unsprung mass, as can result by shrinking or eliminating the spindle bearings used in conventional motors.

Figure 1B:
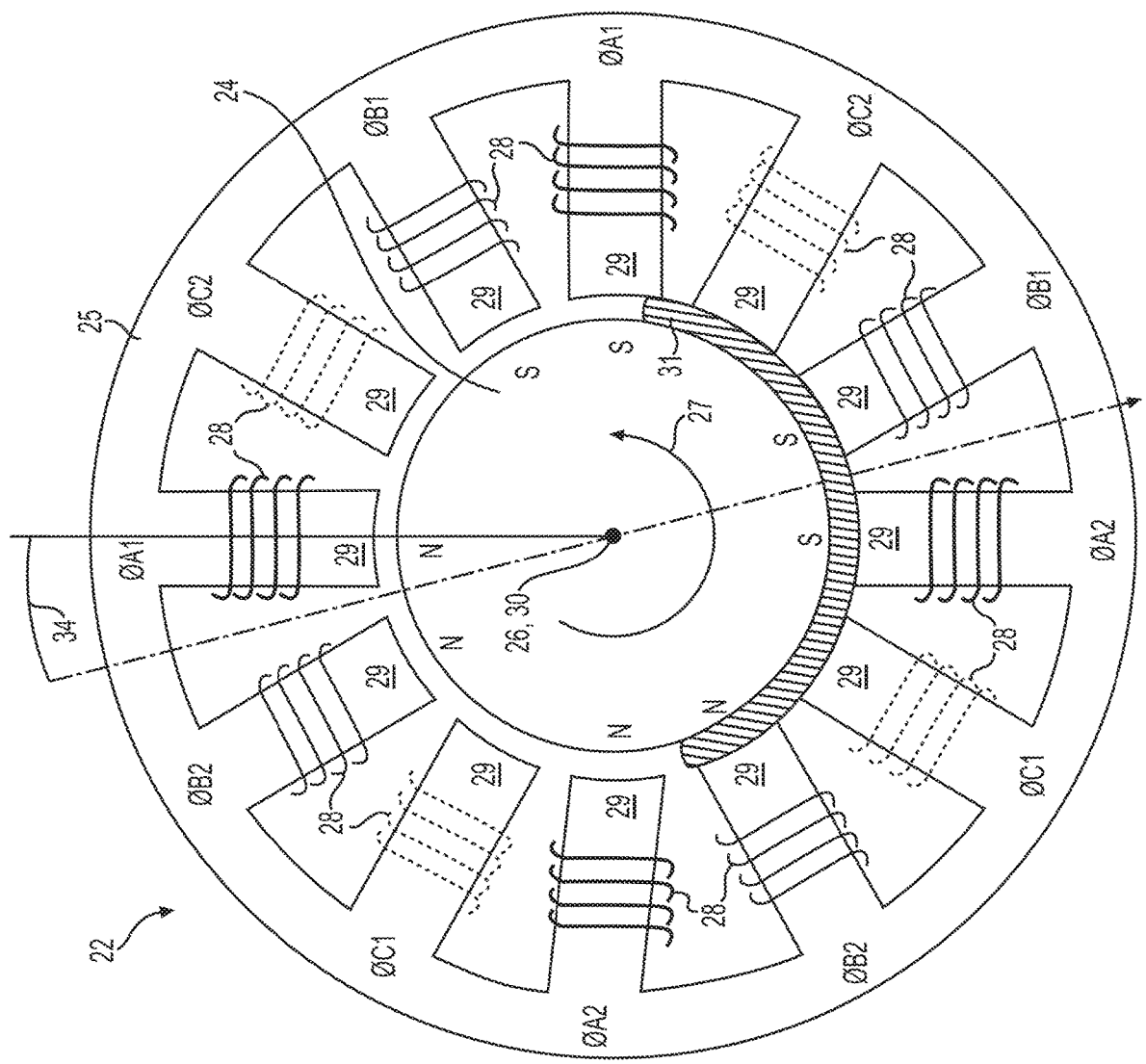
FIG. 1B is a cut-away side view of the example electric motor in a second position.

FIG. 1A shows the electric motor 22 including a rotor 24 in a parked position, contacting a stator 25. FIG. 1B shows the electric motor 22 with the rotor 24 centered within the stator 25, with a drive axis 26 of the rotor 24 overlying and collinear with the central axis 30 of the stator 25.

More specifically, as shown in FIGS. 1A and 1B, the rotor 24 is rotatable about a drive axis 26 as shown by the rotational arrow 27. In some embodiments (not shown), the rotor 24 may be coupled to motor output shaft to provide torque to a load, such as to rotate a wheel of a vehicle. The stator 25 has a plurality of stator windings 28 wound around stator poles 29, which are radially spaced apart from one another about a central axis 30 parallel to the drive axis 26. FIGS. 1A and 1B show a particular embodiment including twelve stator poles 29, each having a stator windings 28 associated with one of three electrical phases (A, B, C). However, the electric motor 22 may have a different number of stator poles 29 and/or a different number and/or configuration of electrical phases (A, B, C). In some embodiments, the stator windings 28 are formed by winding a wire around each of the stator poles 29, as shown in FIGS. 1A and 1B. However, the stator windings 28 may take other forms such as I-pin or hair-pin type bar windings. In some embodiments, and as shown in FIGS. 1A and 1B, the stator windings 28 are each associated with a single one of the stator poles 29. However, each of the stator windings 28 may be operatively coupled to two or more of the stator poles 29. For example, each of the stator windings 28 may wind around two or more of the stator poles 29. Furthermore, in some embodiments, two or more of the stator windings 28 may be wound around one of the stator poles 29.

In the general case, while the electric motor 22 is in operation, the rotor 24 has 6 degrees of freedom to move, 3 translational degrees (X, Y, Z) and 3 angular degrees ("pitch, yaw, roll"). One of these degrees, rotation about the drive axis 26, is the normal mode of operation of the electric motor 22. The other 5 degrees of freedom need to be controlled in some form for the motor to operate safely and efficiently. In the example above, the translational motion of the rotor 24 relative to the stator 25 is controlled by unbalanced magnetic forces cancelling other forces acting on the rotor 24. It is possible to generate forces to control all 6 degrees of freedom of the rotor 24 by using a proper magnetic segmentation of the stator 25.

By using the unbalanced magnetic forces from the stator 25 to control the position of the rotor 24, the electric motor 22 may be provided with smaller spindle bearings than would be required in a conventional motor design to withstand design loads for a given application. In some embodiments, the electric motor 22 may not use any conventional spindle bearings, instead relying only on the unbalanced magnetic forces from the stator 25 to control the position of the rotor 24 and to withstand the design loads for the given application.

In some embodiments, and as shown in FIGS. 1A and 1B, one or more of the stator windings 28 are disposed around and radially outside of the rotor 24. In other words, the stator poles 29 are be disposed around and radially outside of the rotor 24. This configuration may be called an internal-rotor motor. In some embodiments (not shown in the FIGS), one or more of the stator windings 28 are disposed within the rotor 24, with the rotor 24 extending around and radially outwardly of the stator windings 28. In other words, the stator poles 29 may be disposed radially inwardly from the rotor 24 with the rotor 24 annularly surrounding the stator poles 29. This configuration may be called an external-rotor motor.

In some embodiments, and as shown in FIGS. 1A and 1B, the rotor 24 is supported upon a layer of a lubricating fluid 31, such as oil. The lubricating fluid 31 may consist of petroleum-based and/or synthetic oil and may include additives such as, for example, corrosion inhibitors, viscosity stabilizers, and/or for maintaining a specific heat capacity. With the rotor 24 supported upon the lubricating fluid 31, the rotor 24 can be moved by electromagnetic force generated by the stator windings 28 in order to supply clearance space between the rotor 24 and the stator poles 29 for the lubricating fluid 31 to occupy. In some embodiments, the rotor 24 can be moved to supply the clearance space for the lubricating fluid 31 before the rotor 24 is begun to rotate.

Figure 2:
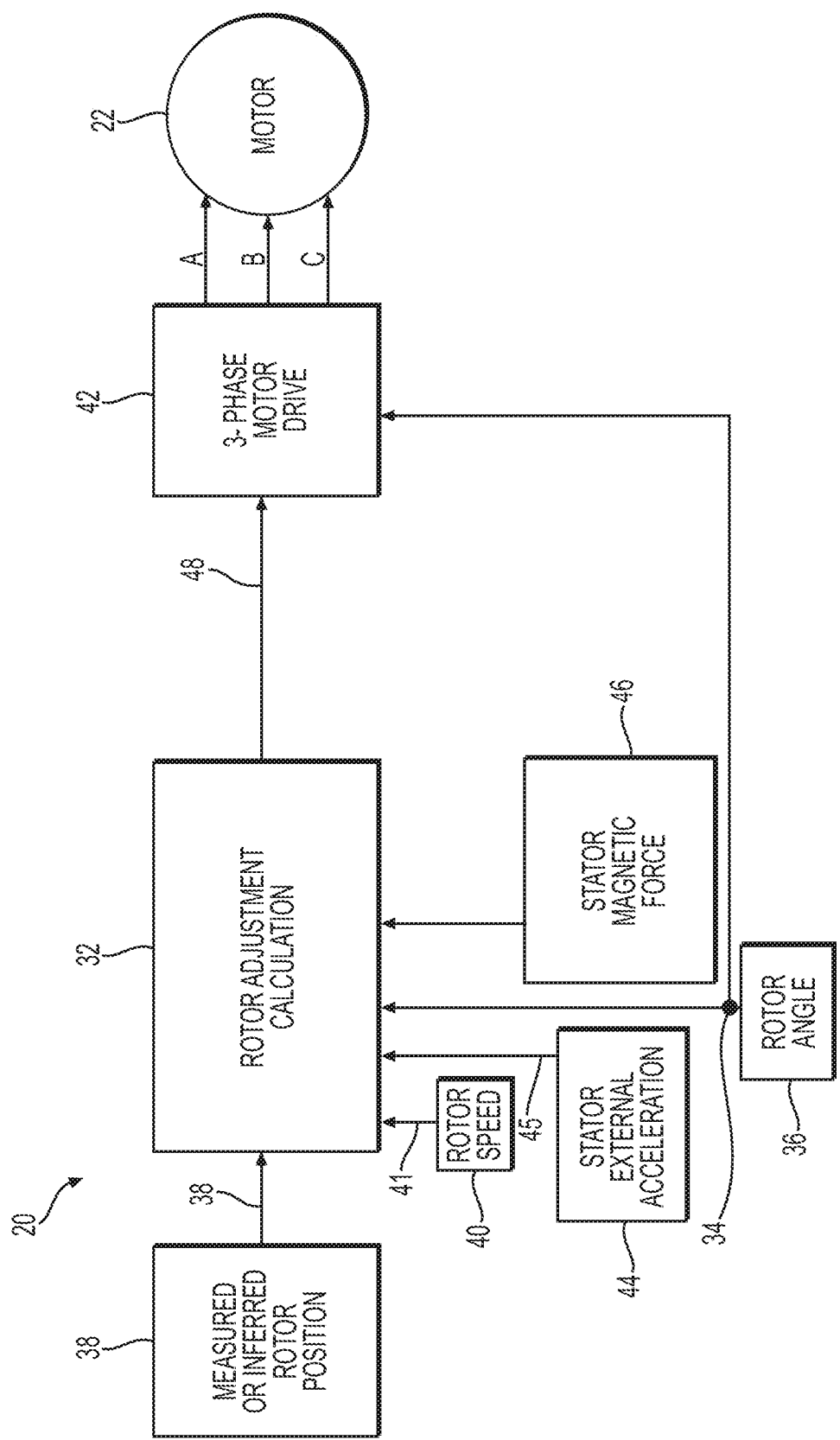
FIG. 2 is a schematic block diagram of a system in accordance with an aspect of the present disclosure.

As shown in the schematic block diagram of FIG. 2, the system 20 includes a controller 32 configured to monitor a position of the rotor 24 relative to the stator poles 29. For example, in some embodiments, the controller 32 monitors the radial position of the rotor 24, and/or the position of the drive axis 26 relative to the central axis 30. In some embodiments, the controller 32 is configured to monitor one or more electrical characteristics of the stator windings 28 in order to determine the radial position of the rotor 24 relative thereto. The one or more electrical characteristics may include, for example, a resistance or an inductance. For example, one of the stator poles 29 may experience a reduced reluctance when the rotor 24 is moved radially closer to that one of the stator poles 29. Such a reduced inductance can then be detected by the controller 32 as a change in the one or more electrical characteristics of the stator winding 28 or windings 28 associated with that one of the stator poles 29.

In some embodiments, the controller 32 also monitors a rotor angle 34 of the rotor 24 as the rotor 24 spins about the drive axis 26. An example rotor angle 34 is illustrated in FIG. 1B. The rotor angle 34 is measured between example radial positions on each of the rotor 24 and on the stator 25. A rotor angle detector 36, which may be an independent device, such as a rotary encoder, reluctor, or potentiometer, may be used for this purpose. Alternatively or additionally, the controller 32 may be configured to determine the rotor angle 34 of the rotor 24 based on one or more electrical characteristics of the stator windings 28, such as frequency and phase of electrical currents induced in one or more of the stator windings 28, and/or by changes in the impedance of the stator windings 28 that affect the voltage and/or electrical current in the stator windings 28. Similarly, a speed sensor 40 may monitor a rotary speed of the rotor 24, which may be expressed in angular units per unit of time or in rotations per unit time, and which may also include a rotation direction (e.g. clockwise/counterclockwise or forward/reverse), which may be reported, for example, as a positive or negative direction of the units used for the rotary speed, or as a separate flag or boolean value. The speed sensor 40 may communicate a speed signal 41 to the controller 32, indicating the rotor speed for use in adjusting the position of the rotor 24.

A motor drive 42 is configured to provide an AC or DC electrical current to each of the stator windings 28 for controlling the rotor 24 to rotate about the drive axis 26 and for using the electric motor 22 to perform mechanical work, such as for accelerating a vehicle. The motor drive 42 may be a variable frequency device that uses power electronic switching to provide AC electrical current at a range of different voltages and/or frequencies to operate the electric motor 22 at a variety of different speeds. The motor drive 42 may be configured to provide single-phase or 3-phase electrical current to the electric motor 22. The controller 32 may be configured to cause the motor drive 42 to provide phase current adjustments of the electrical current in one or more of the stator windings 28 to cause the rotor 24 to move in a radial direction perpendicular to the drive axis.

The controller 32 is configured to cause the rotor 24 to be controlled to a predetermined position relative to the stator 25. The predetermined position may include the rotor 24 being centered upon the central axis 30. In other words, the controller 32 may center the rotor 24 within the stator windings 28, with the drive axis 26 overlying and collinear with the central axis 30. This may be done before the rotor 24 begins to turn, and may be maintained while the rotor 24 is rotated about the drive axis 26. In this way, adequate clearance between the rotor 24 and the stator windings 28 can be maintained while running the electric motor 22. In another example, the predetermined position may include the rotor 24 being adjacent to or contacting the stator 25. One example of rotor 24 being adjacent to or contacting the stator 25 is the parked position of the rotor 24 shown in FIG. 1A. In some embodiments, the controller 32 is configured to move the rotor 24 to the desired position at predetermined velocity and/or acceleration to prevent or minimize damage that could result from the rotor 24 colliding with the stator 25.

According to an aspect of the disclosure, a position sensor 38 measures the radial position of the rotor 24 relative to the stator windings 28. In other words, the position sensor 38 measures the location of the drive axis 26 relative to the central axis 30. In some embodiments, the position sensor 38 operates independently of the stator windings 28. The position sensor 38 may take one or more of several different forms; for example, a hall-effect sensor may be used to detect the proximity to a magnet mounted on the rotor 24. A differential hall-effect sensor arrangement may be used to detect proximity to one or more magnets mounted on the rotor 24 in a manner that rejects being influenced by external magnetic fields, rejects variations in hall-effect sensor performance and/or compensates for changes or differences in the magnet or magnets mounted on the rotor 24. Similarly, an array of hall-effect sensors may be used to achieve these goals with better accuracy.

In other embodiments, the position sensor 38 includes one or more of the stator windings 28, allowing the radial position of the rotor 24 to be determined by measuring one or more electrical characteristics of the one or more of the stator windings 28. For example, the complex impedance of the stator windings 28 may change in response to the position of the rotor 24 relative to the stator pole 29 or poles that are associated with that stator winding 28. This sensing of the position of the rotor 24 may be accomplished using an optimal estimator such as a maximum likelihood estimator or an extended Kalman filter. Furthermore, where the rotor 24 is a solid or generally rigid structure, when a rotor-stator gap closes on one side of the rotor 24 the rotor-stator gap will open a corresponding amount on the other side of the rotor 24. A combination of measurements on opposite sides of the rotor 24 can be used to reduce noise in the position sensor 38 in either or both the independent sensor device and impedance methods of determining the radial position of the rotor 24.

In the block diagram of FIG. 2, the controller 32 is configured to perform a Rotor Adjustment Calculation using various sources of information to calculate both angle-based adjustments using the rotor angle 34 and non-angle-based adjustments that are independent of the rotor angle 34. The angle-based adjustments may be based solely on measured rotor displacements or have a feed-forward term that is a function of measured rotor speed or a previously identified stator magnetic field strength.

The electric motor 22 may include any type of motor. For example, in some embodiments, the electric motor 22 is a permanent magnet type motor, in which the rotor 24 includes one or more permanent magnets for interacting with a magnetic field produced by the stator windings 28. In other embodiments, the electric motor 22 is an induction motor, such as a squirrel-cage type design in which an electric current is induced in the rotor 24 by electromagnetic induction from a magnetic field of the stator windings 28. In other embodiments, the electric motor 22 is a reluctance type motor in which non-permanent magnetic poles are induced in a ferromagnetic material of the rotor 24.

In the example embodiment shown in FIGS. 1A and 1B, the electric motor 22 is a three-phase motor, configured to be supplied with a three-phase electrical power source. In some embodiments, and as shown in FIG. 2, the three-phase electrical power source includes a 3-phase motor drive 42. The electric motor 22 may include an integer number of stator windings 28 associated with each of the phases of the three-phase electrical power source, which may be called A, B, and C. Each of the stator poles 29 are labeled with an associated winding identifier θA1, θA2, θB1, θB2, θC1, θC2. In the example embodiment shown in FIGS. 1A and 1B, the electric motor 22 is a three-phase motor with twelve stator slots separating the stator poles 29, so each phase current is applied to four stator windings 28 with the stator windings 28 evenly spaced around the stator (as every third winding). In this case, we can divide the stator windings 28 into four groups of three adjacent phase windings, which creates four quadrants around the stator. The four quadrant sections of the electric motor 22 may be excited with the normal three-phase currents to produce rotor torque.

In some embodiments, the phase currents in the stator windings 28 can be adjusted on a per-quadrant basis to create a net radial force on the rotor 24 to control the translational radial position of the rotor 24, which may be used, for example, to keep the rotor 24 centered. The electrical current in each individual stator winding 28 may be adjusted independently. These adjustments are typically very small changes in current compared to the normal, torque producing, phase currents, which may be generated, for example, by one or more traditional algorithms for three-phase motor speed control (e.g. trapezoidal, sine wave, field-oriented control) in a variable-frequency motor drive. The rotor position control method of the present disclosure and/or other algorithms or techniques providing a net radial force on the rotor 24 may be used together with any of these or other motor speed control algorithms.

In addition to polyphase rotor currents which are used to create a rotating magnetic field that creates rotor angular force, such as are provided by traditional variable-frequency motor control techniques, the system 20 of the present disclosure may use rotor current variations to create a magnetic field component that imparts a net radial force on the rotor 24 to control a radial position of the rotor 24, and which may, for example, be configured to center the rotor 24 inside of the stator 25 with a net radial force (non-cancelling forces on opposite sides of the rotor). This control may be used to compensate for small mass imbalances in the rotor 24 that can tend to cause the rotor 24 to rotate about its center of mass instead of its geometric center. This control may also be used to compensate for small magnetic field strength imbalances that can tend to pull the rotor 24 unevenly in radial directions relative to the stator 25.

Electrical currents in the stator windings 28 may be adjusted to provide the net radial force on the rotor 24 in order to control the position of the rotor 24 relative to the stator 25. For example, the force required to center the rotor 24 may be a function of rotor speed, rotor mass imbalance, stator magnetic field strength and rotor magnetic imbalance. These parameters relating speed and stator magnetic field strength to rotor balance force may be measured in advance and stored in a table or they may be identified in real-time using estimation techniques. Such adjustment currents may be provided in either of two general forms: where a net radial force is applied as adjustments that are a function of the angular displacement or position of the rotor 24, and where the net radial function is applied which is not a function of the rotor angle 34. In any case, the adjustments may alter a voltage that is applied to one or more of the stator windings 28 by the motor drive 42, for example, by increasing or decreasing the voltage applied to one or more of the stator windings 28 and/or by changing the timing or phase angle of the voltage applied to the stator windings 28.

In the first general form, adjustments configured to apply a net radial force to the rotor 24 are a function of the rotor angle 34. These adjustments may correct for static rotor mass imbalance, rotor magnetic imbalance or vibrations impressed on the rotor 24 by machinery, such as gearing, fixed to the rotor 24.

In the second general form, the adjustments are not a function of rotor angular displacement. These adjustments may be related to a vibration impressed on the stator 25 by external forces. For example, in a wheel end motor application, up and down movement of the wheel end in response to bumps in the road will create adjustments that are in a fixed relationship to the stator 25 and not related to the rotor's angular position. These adjustments may also be used to account for mechanical vibrations in the electric motor 22 and surrounding machinery, dynamics of the lubricating fluid 31, and/or other external forces. External accelerations of the stator 25 may be measured by a stator accelerometer 44 and may be communicated to the controller 32 as an acceleration signal 45 for use in calculating the adjustments to be applied to the rotor 24.

These non-angle-based corrections take the form as an "anti-noise" signal to cancel out the effects of vibrations in the rotor centering position. For example, mechanical resonances in structures supporting the electric motor 22 can cause vibrations in the electric motor 22 which are unrelated to the speed of the electric motor 22 and/or to the angular position of the rotor 24. These structural vibrations may be dampened and/or offset by centering force adjustments that are a function of the frequency and phase of the structural vibrations.

In calculating an adjustment to be applied to the rotor 24, the controller 32 may also take into account the magnetic forces 46 within the stator 25 at any given time and/or as a function of time and the impact that the adjustment will have on those magnetic forces 46, such as, for example, energy dispersal resulting from a collapsing magnetic field.

In some embodiments, the system 20 may control the position of the rotor 24 when the rotor is stopped from rotating, which may gently move the rotor 24 into a parked position, and which can prevent the rotor 24 from forcibly striking one or more of the stator poles 29, for example, in applications where the electric motor is installed in a horizontal orientation.

In some embodiments, the system 20 of the present disclosure provides for an electric motor 22 with a rotor 24 that is supported solely upon the layer of lubricating fluid 31, and which does not include spindle bearings. By controlling the radial position of the rotor 24, the system 20 may ensure that the lubricating fluid 31 is maintained in all modes and conditions of motor operation. This includes startup, high torque operation, during external vibration/shock events, critical speeds, low speed and high speed. The system 20 may also maintain the rotor 24 in its optimal position relative to the stator 25. The system 20 of the present disclosure can, therefore, ensure that the lubricating fluid 31 remains in a specified thickness range, and that the rotor 24 remains centered within the stator 25. By insuring that the rotor 24 is centered relative to the stator 25 during operation, shearing forces exerted by the lubricating fluid 31 are minimized. This, in turn, minimizes the spin loss or frictional loss of the plain bearing formed by the rotor/stator system.

For an electric motor 22 with a lubricant-supported rotor 24, when the motor is turned off, the rotor 24 may have settled or parked such that it is in contact with the stator 25. During startup of the electric motor 22, it may be desirable to re-center the rotor 24 relative to the stator 25 before spinning the rotor 24. This re-centering may be achieved with support by the lubricating fluid 31 and/or with net radial magnetic force generated by the stator windings 28 as described above.

The system 20 including an electric motor 22 with a lubricant-supported rotor 24 and with dynamic rotor position control, as is provided in the present disclosure may compensate for rotor mass imbalance, and/or rotor magnetic imbalance, and may provide for control of the lubricating fluid 31 and rotor un-parking. Such a system 20 may provide several advantages over existing designs. Overall, a lubricant-supported motor may provide higher torque and lower weight for applications in harsh shock and vibration environments. The system 20 of the present disclosure improves these advantages with dynamic control of the rotor position.

Figure 3:
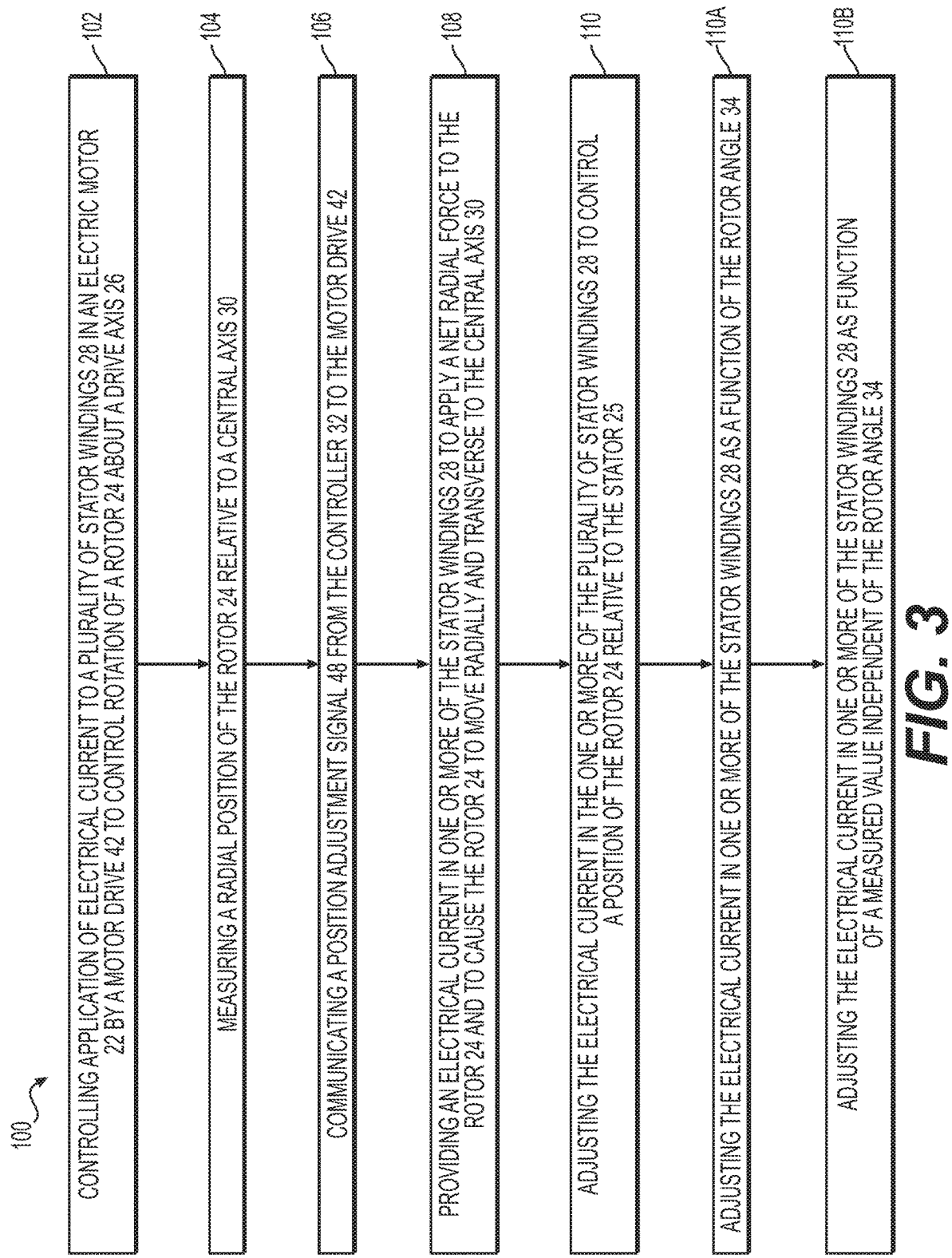
FIG. 3 is a flow chart listing example steps of a method in accordance with the present disclosure.

As described in the flow chart of FIG. 3, a method 100 for controlling a radial position of a rotor 24 of an electric motor 22 is also provided. The method 100 includes controlling application of electrical current to a plurality of stator windings 28 in the electric motor 22 by a motor drive 42 to control rotation of a rotor 24 about a drive axis 26 at step 102. This step may be performed by traditional means used for variable frequency control of an AC motor drive.

The method 100 also includes measuring a radial position of the rotor 24 relative to a central axis 30 of the stator 25 at step 104. The radial position of the rotor 24 may be a translational position, which may be expressed as a vector including direction and magnitude. The radial position of the rotor 24 may be expressed as the difference in position between the drive axis 26 and the central axis 30 of the stator 25. This step 102 may be performed by a position sensor 38 configured to communicate a position signal 39 to the controller 32.

The method 100 also includes communicating a position adjustment signal 48 from the controller 32 to the motor drive 42 at step 106. The position adjustment signal 48 may be proportional to the radial position of the rotor 24 and may take into account other factors such as, for example, the speed of the rotor 24, in either or both of a rotary and/or in one or more translational directions. The position adjustment signal may also take into account magnetic forces in the stator poles 29 of the electric motor, external accelerations of the electric motor 22, etc.

The method 100 also includes providing an electrical current in one or more of the stator windings 28 to apply a net radial force to the rotor 24 and to cause the rotor 24 to move radially and transverse to the central axis 30 at step 108. This electrical current may be provided by the motor drive 42 as an adjustment or difference from the current provided for normal rotation as described at step 102, above. This electrical current and the corresponding stator windings 28 that are determined by the position adjustment signal 48 from the controller 32.

In some embodiments, the method 100 includes adjusting the electrical current in one or more of the stator windings 28 to control a positon of the rotor 24 relative to the stator 25 at step 110. Step 110 may include adjusting the electrical current in one or more of the stator windings 28 as a function of the rotor angle 34 at sub-step 110A. This sub-step may be used, for example, to compensate for the rotor 24, or a part attached to it being out of balance that could otherwise cause the rotor 24 to wobble in an eccentric path as it is rotated. Alternatively or additionally, step 110 may include adjusting the electrical current in one or more of the stator windings 28 as function of a measured value independent of the rotor angle 34 at sub-step 110B. The measured value may be used to compensate for an external force, such as up-and-down movement of the rotor 24 in response to bumps in the road where the electric motor 24 is used in a vehicular application. For example, an adjustment may be a function of an acceleration signal from an accelerometer coupled to the stator 25 of the electric motor 24.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor for propelling a wheel of a vehicle, the electric motor comprising:
   a rotor rotatable about a drive axis;
   a stator including a plurality of stator poles circumferentially spaced apart from one another about a central axis;
   the rotor and the stator disposed adjacent to and operably coupled to a wheel of a vehicle;
   a layer of lubricating fluid supporting the rotor relative to the stator;
   a controller configured to monitor a radial position of the rotor relative to the plurality of stator poles;
   a motor drive configured to provide an electrical current to each of a plurality stator windings for controlling the rotor to axially rotate about the drive axis; and
   the controller configured to operate the motor drive to selectively and individually adjust the electrical current associated with each of the plurality of stator windings to effectuate radial movement of the rotor transverse to the central axis for controlling the radial position of the rotor relative to the stator.

2. The electric motor of claim 1, wherein the controller is configured to selectively and individually adjust the electrical current associated with one or more of the plurality of stator windings as a function of a rotor angle to control the radial positon of the rotor relative to the stator.

3. The electric motor of claim 1, wherein the controller is configured to selectively and individually adjust the electrical current associated with one or more of the plurality of stator windings as a function of a signal independent of a rotor angle to control the radial positon of the rotor relative to the stator.

4. The electric motor of claim 1, wherein the controller is configured to effectuate radial movement of the rotor to a predetermined radial position relative to the stator.

5. The electric motor of claim 1, wherein the plurality of stator poles are disposed around and radially outside of the rotor.

6. The electric motor of claim 1, wherein the plurality of stator poles are disposed radially inwardly from the rotor with the rotor annularly surrounding the stator poles.

7. The electric motor of claim 1, wherein the radial position of the rotor is measured directly by a position sensor independent of the plurality of stator windings.

8. The electric motor of claim 1, wherein the radial position of the rotor is determined indirectly by measuring one or more electrical characteristics associated with at least one of the plurality of stator windings.

9. The electric motor of claim 1, wherein the electric motor is a permanent magnet type motor, wherein the rotor includes one or more permanent magnets for interacting with a magnetic field produced by the plurality of stator windings to produce a driving torque.

10. The electric motor of claim 1, wherein the electric motor is an induction type motor.

11. The electric motor of claim 1, wherein the electric motor is a reluctance type motor.

12. The electric motor of claim 1, wherein the electric motor is a three-phase motor configured to be supplied with a three-phase electrical power source; and
   wherein the plurality of stator windings include an integer number of stator windings associated with each of the phases of the three-phase electrical power source.

13. The electric motor of claim 1, further including a rotor angle detector for determining an angle of rotation of the rotor relative to the plurality of stator windings.

14. The electric motor of claim 4, wherein the predetermined radial position includes the rotor being centered relative to the stator, with the drive axis overlying the central axis.

15. The electric motor of claim 1, further including a motor output shaft extending between the rotor and the wheel of the vehicle for establishing the operable coupling and providing torque to rotate the wheel of the vehicle.

* * * * *